United States Patent Office 2,994,758
Patented Aug. 1, 1961

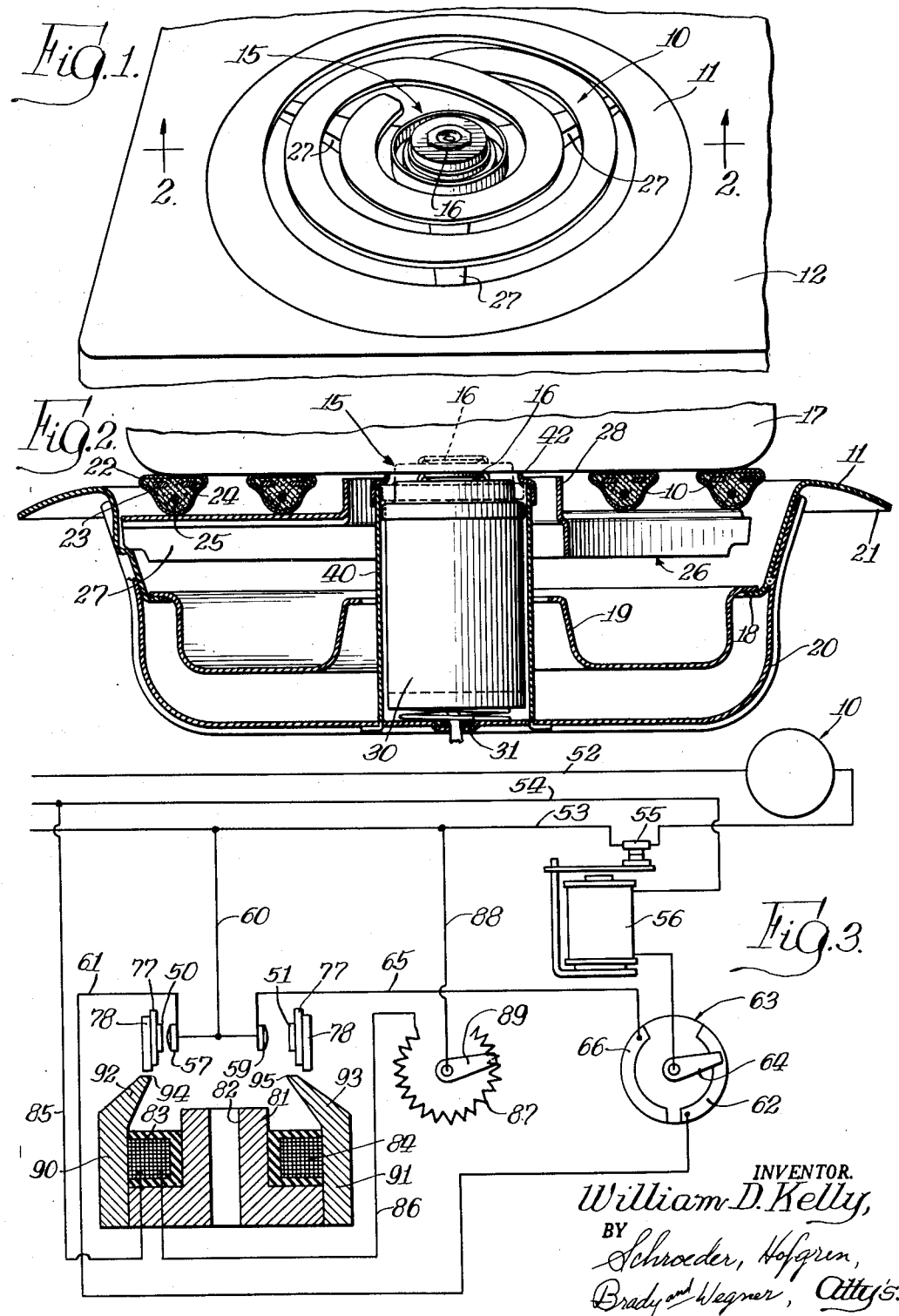

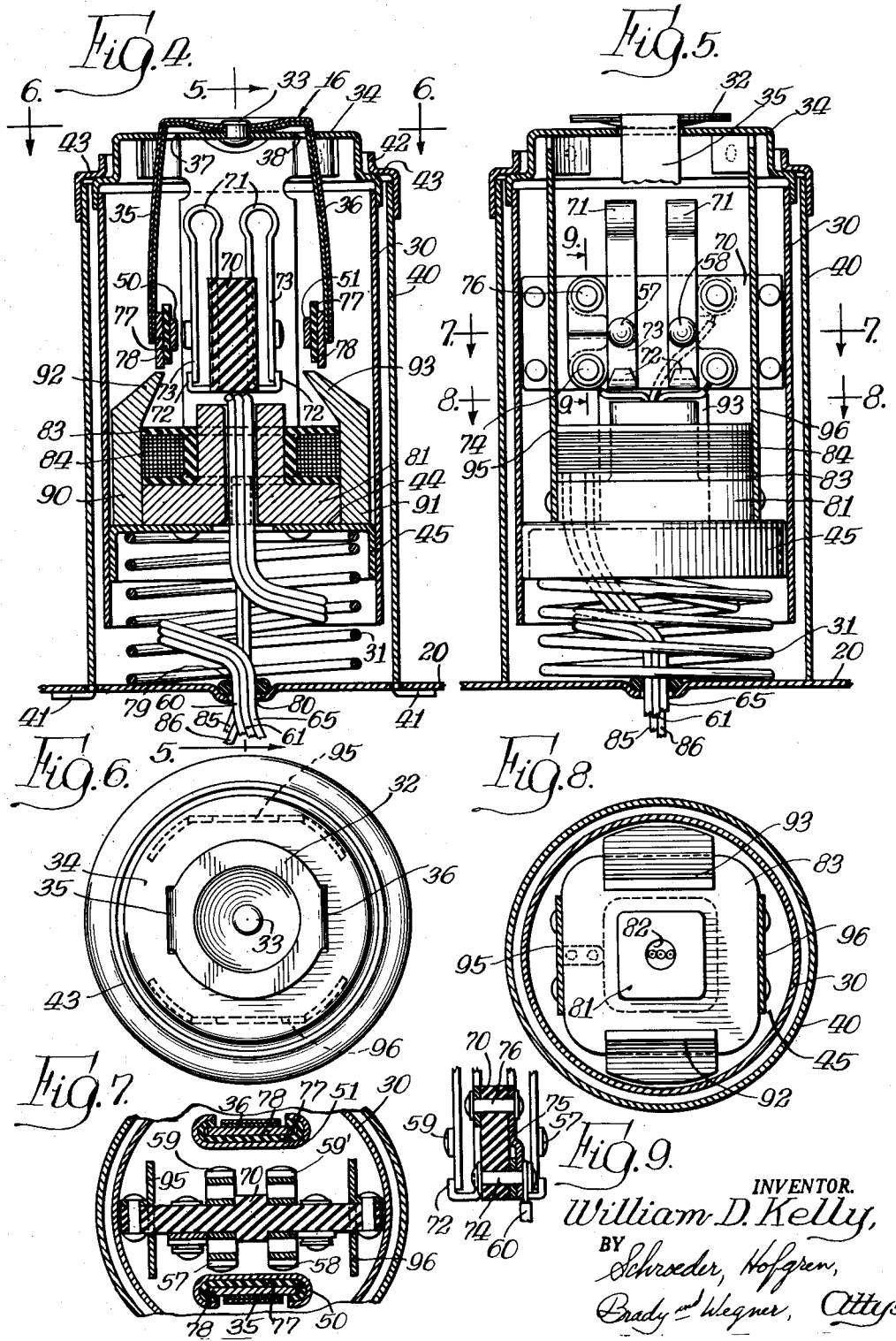

2,994,758
HEATING UNIT CONTROL
William D. Kelly, Western Springs, Ill., assignor, by mesne assignments, to Ferro Corporation, Cleveland, Ohio, a corporation of Ohio
Filed Feb. 8, 1956, Ser. No. 564,259
4 Claims. (Cl. 219—20)

This invention relates to a heating unit control means and more particularly to a control apparatus responsive to the temperature of a receptacle being heated by the unit.

It is the general object of this invention to produce a new and improved heating unit control means.

It is a more specific object of the present invention to provide an improved heating unit control apparatus responsive to the temperature of a receptacle heated by the unit.

Another object of the invention is the provision of a heating unit control for a thermally responsive sensing unit for sensing the temperature of a receptacle heated by the unit in order to control heating unit output, and a selectively variable retarder acting in opposition to the sensing element operation permitting control of the unit over wide temperature ranges.

One of the features of the present invention is the provision of a cooking stove heating unit control means having a thermally responsive unit for sensing the temperature of a heated receptacle coupled with a means for manually varying the response of the unit in order to obtain desired heating of the receptacle over a wide range of temperatures.

The foregoing and other objects, features and advantages of the present invention will be understood from a description of a specific embodiment illustrated in the accompanying drawings, in which:

FIGURE 1 is a fragmentary perspective view of an electric range unit mounted in a range and having the control means of the present invention therein;

FIGURE 2 is a vertical sectional view through the unit of FIGURE 1 taken substantially along line 2—2 and fragmentarily showing a pan setting upon the unit;

FIGURE 3 is a schematic wiring diagram illustrating the circuit employed in the control means;

FIGURE 4 is a vertical sectional view through the sensing unit enlarged to show the details thereof;

FIGURE 5 is a view similar to FIGURE 4 taken substantially along line 5—5 in FIGURE 4;

FIGURE 6 is a top plan view of the sensing unit taken substantially along line 6—6 in FIGURE 4;

FIGURE 7 is a horizontal fragmentary sectional view through the sensing unit taken substantially along line 7—7 in FIGURE 5;

FIGURE 8 is a view similar to FIGURE 7 taken along line 8—8 in FIGURE 5; and

FIGURE 9 is a fragmentary sectional view through the connection of the power source to the contacts of the unit taken substantially along line 9—9 in FIGURE 5.

While this invention is susceptible of embodiments in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

There has long been a need for a simplified heating unit control which would permit selection of the maximum temperature to which a receptacle could be heated. This need is particularly acute for the top heating units of cooking stoves or ranges. The top units of cooking stoves are usually provided with on-off controls which permit some selection of heat output but no control to limit the heat output to a predetermined maximum or to permit selection of a given heat which the unit will automatically produce. Consequently, constant attention is required in order to achieve proper cooking and avoid either uncooked or burned food.

In general, the present invention provides a heating unit control having a thermally responsive member for sensing the temperature of the receptacle being heated in order to control the flow of heat producing energy to the unit, i.e. to provide the unit with heating energy at various levels. Variation in the amount of heat output of the unit is attained by manually adjusting a retarding means operative on the thermally responsive member to obtain the desired temperature level of the receptacle. The particular control to be described permits variation of the temperature of a receptacle within both a high and a low temperature range. Upon selection of a desired temperature in either high or low range, the control will automatically maintain that temperature by sensing the temperature of the receptacle and control the operation (more particularly, the output) of the heating unit in accordance with the temperature of the receptacle.

The specific embodiment of the invention chosen for purposes of illustration is a control incorporated in a heating unit of an electric range, although it will be clear to those skilled in the art that the principles of the invention are applicable to a gas burner as well as heating apparatus other than stoves. As shown, the heating unit is provided with an electrical heating coil 10 surrounded by a decorative ring 11 supporting the unit in the range top 12 all as shown in FIGURE 1. The control sensing unit 15 is located in the central part of the heating unit and has a thermally responsive generally U-shaped bimetallic member 16 having its base exposed for contact with the bottom of a pot, pan or other receptacle 17 placed on the unit. FIGURE 2 illustrates a section through the heating unit as removed from the stove or range. The decorative ring 11 around the unit has an inwardly turned flange 18 midway in the depth of the unit for supporting an annularly dished pan 19 which serves to catch any spillage from the cooking vessel. The pan 19 is readily removed for cleaning. A supporting strap 20 is shown as extending across the heating unit at the bottom and attached to the outer surface of the decorative ring below the top contacting outer edge 21 of the ring. This strap lends rigidity to the heating unit structure and serves to hold in place the control sensing unit 15. The particular unit illustrated is a nominally 220 v. electrical heating coil which, as may be seen in FIGURE 2, is a tubular member 22 having a pair of heating wires 24 near the flat top of the tube and a small return line 25, all insulated one from the other. The tube may preferably be supported in proper relation to the top of the decorative ring 11 by means of a spider 26 which may have three arms 27 approximately 120° apart as illustrated in FIGURE 1 and has a central upstanding cylindrical flange extending about the sensing unit acting in some degree as a barrier to direct radiation of heat from the adjacent coil portion to the sensing unit.

The sensing unit is floatingly mounted on the heating unit and thus is arranged to move vertically relative to the heating unit so that a spring may urge it upwardly into contact with a cooking vessel placed on the unit. In FIGURE 2, the full line position of the inner unit container 30 is shown with the base of the bimetallic member 16 in contact with the lower surface of the pan 17. The dotted line position illustrates the rest position of the inner container 30 when the pan is removed so that the base of the bimetallic member 16 is above the plane of the heating unit coil. A spring 31 bearing upon the cross member 20 and the lower or bottom portion of the inner container 30 provides a resilient yieldable force urging the sensing unit upwardly.

The particular structure of the sensing unit may best be seen in FIGURES 4 to 9. The bimetallic member 16 has a central generally circular portion 32, centrally dished to receive an attaching rivet 33 secured to the upper cover 34 on the inner container 30. Two generally rectangular legs 35 and 36 extend downwardly through openings 37 and 38 provided in the top cover 34 so that the legs may extend downwardly inside the outer container 30.

In order to accommodate the vertical movement of the sensing unit, the inner container 30 is guidingly housed within a cylindrical outer casing 40 having fingers 41 at its lower end passing through appropriate slot in the cross member 20 so as to secure the outer container in place. An open cap-like member 42 is secured to the upper end of the container in order to provide a flange 43 against which the cover 34 of the inner container may abut to limit the upward movement of the sensing unit relative to its outer container. The spring 31 bears upon the cross support 20 of the heating unit and outwardly against a supporting plate 44 having a downturned flange 45 which is secured to the inner surface of the inner container 30. The spring is of several coils and of light construction so that little effort is required to overcome its resiliency. However, the spring is sufficiently strong to return the sensing unit to its upper position once a cooking vessel is removed from the heating unit and to hold it against the vessel.

The bimetallic member of the sensing unit is so constructed that it contacts the cooking vessel and thus is heated by conduction from the vessel to the bimetallic legs 35 and 36. These legs flex in proportion to the heat they receive and are used for control of the maximum temperature to which the vessel will be heated. The legs carry a contact bridge 50 or 51 respectively for completing a circuit to a relay coil which, with its relay contacts, serves to stop flow of electrical energy to the heating unit. Thus, as the heat of the receptacle reaches a certain level, the cooperation of the bemetallic sensing unit and the circuit associated with the relay coil will operate to shut off the flow of current to the heating unit.

The circuit involved in the operation of the bemetallic members and contacts mentioned above are better seen in FIGURE 3. The heating unit 10 is provided with the nominally 110 v. lines 52 and 53 of a three line system including the neutral line 54 with an on and off switch control for the unit (not shown). The control circuit is diagrammatically illustrated as embodying relay contacts 55 in the 110 v. line 53 operated by the relay coil 56. The contact bridges 50 and 51 are illustrated in FIGURE 3 as adjacent contacts 57 and 59 respectively. Power line 60 leads from line 53 to the contacts 57 and 59 for the purpose of carrying current to the relay coil through one or the other of the contact bridges. The contact bridge 50 on the lefthand side of FIGURE 3 is for controlling the unit through a low heat range which may, for example, extend up to boiling temperature. Line 61 extends from contact 58 paired with contact 57 to one strap 62 of the two-position switch 63. When the contact bridge 50 moves over to make contact with contacts 57 and 58, (the latter shown in FIGURES 5 and 7), current will flow through the line 61 to the strap 62 through the contacter 64 of the switch and thus to the relay coil to open the relay contacts 55 breaking the circuit to the unit. Upon cooling of the receptacle on the heating unit, the bimetallic element would carry the contact bridge 50 out of contact with the contacts 57 and 58, thus breaking the circuit to the relay coil permitting the relay contacts to return to their closed position, thus starting energy flow to the unit 10 again. The contact bridge 51 on the righthand side of the low temperature contacts illustrated in FIGURE 3 is for the purpose of controlling the heating unit temperature in a high range extending, for example, above boiling to broiling temperatures. Either one or the other set of contacts are rendered operative by use of the two-position switch 63. A line 65 extends from the contact 59' (FIGURE 7) to the other strap 66 of the two-position switch 63 and operates in the same manner to control the relay coil and its contacts.

The specific structure of the sensing unit illustrated in FIGURES 4 to 9 includes a contact mounting block 70 to which are attached generally U-shaped spring yieldable contact carriers 71, yieldable inwardly toward the contact mounting block under influence of the bimetallic leg elements 35 and 36 coming against the contacts. The outward extension of movement of the contact carriers is limited by cooperating flange 72 on the lower end of the carrier inside of which the lower arm 73 of the carrier is positioned. The power source line 60 is led into the contacts 57 and 59 as illustrated in FIGURE 9. The rivet 74 attaching the carrier for contact 57 is equipped with a conductor strap 75 carrying the current through a rivet 76 to the carrier for the contact 59. In this manner, the lead 60 can conduct current to both the low and the high temperature range controlling contacts. Since the control in both the low and high temperature ranges embodies two contacts which are bridged by a bridge contact carried by the bimetallic legs, a simple and easily manufactured bridge contact 50 or 51 may be used. As illustrated in FIGURE 7, the bridge contacts may be of silvered material merely clamped around an insulating block 77 and an armature 78 secured to the bimetallic leg. Movement of the leg toward the contacts will permit the bridge member to complete the circuit between adjacent contacts in the control in either temperature range. The leads 61 and 65 are connected to contacts 58 and 59' and extend downwardly through the unit along with the power source line 60. A rubber ring 79 is provided around an opening 80 in the supporting member 20 at the bottom of the heating unit in order that the insulation on the wires is not cut by the metal.

The U-shaped bimetallic member of the sensing unit is made in one piece so that the legs 35 and 36 which carry the contact bridges will flex according to the heat of the receptacle in the same manner. That is, each leg will have the same characteristics according to the heat of the vessel as the other leg. In the present invention a graduated control of the heating unit within each of two separate temperature ranges, the low range being entirely below the upper or high range, is provided by a retarding means to act upon the bimetallic legs delaying or resisting their tendency to move under influence of the heat of the receptacle. In the present invention, this retarding means is in the form of an electro-magnet having cores positioned adjacent the armatures carried by the bimetallic legs. Referring particularly to FIGURE 3, cylindrical iron core 81 of metal with an opening 82 centrally therethrough for the passage of the wires needed in the unit, supports a nylon spool 83 within which the coils 84 of the magnet are located. One lead 85 from the neutral line 54 extends into the coil and the other lead 86 from the coil extends into a rheostat 87 having a lead 88 from its control post and arm 89 to one of the 110 v. lines 53. By use of the rheostat in the usual manner, the intensity of the flux field produced by the electromagnet may be varied. The magnet is provided with a pair of soft iron poles, 90 for the low temperature range and 91 for the higher temperature range. Each pole is secured to the outer surface of the soft iron core and has an upwardly and inwardly extending lip portion 92 and 93 respectively terminating with a flat upper surface quite close to the armature 78 carried by the bimetallic legs. The pole pieces are differently formed with that of the low temperature range extending toward the center of the unit a distance less than that of the pole piece for the high temperature range. That is to say, the bimetallic leg 35 for the low temperature range has to flex inwardly toward the adjacent contacts 57 and 58 a short distance to carry the armature 78 past the tip 94 of the adjacent pole piece. The bimetallic leg 36 for the high temperature range has a different angle to the portion 32 and moves a much greater distance to carry its armature 78 past the tip 95 of its adjacent pole piece. Thus, the influence of the flux field produced by the electro-magnet will be sustained longer on the armature of the high temperature range control leg delaying the operation of the leg 36 longer than that of the low temperature range leg 35. This provides control of the heating unit within both low and high temperature ranges with the action of a single bimetallic control piece having two integral legs. In each case the flux field may be varied to change the intensity of the field providing graduated control in each temperature range of the cooking vessel temperature.

The incorporation of the electro-magnet in the sensing unit is best seen in FIGURES 4 to 9 wherein it will be noted that the iron core 81 of the magnet sets directly upon the cross member 44 against which the coil spring abuts. A pair of cap support straps 95 and 96 are secured to the core and extend upwardly to support the cap 34 on the inner cylindrical container 30. This permits an easy assembly of the unit since the contact mounting member may be secured as illustrated in FIGURE 7 to the straps 95 and 96 permitting the electro-magnet and contacts to be inserted as a unit within the inner container 30.

The control of the present invention permits the heating unit to be controlled in accordance with the temperature of the receptacle or vessel placed thereon. For example, a cooking vessel 17 placed on the unit 10 may be controlled in its heat to a particular level. The person operating the unit has merely to turn it on with a simple on-off switch and then make a selection as to whether the heat is to be in low or high temperature range with the two-position switch 63. The heat of the receptacle is thereafter controlled by the rheostat arm 89 which may be manually adjusted to control the response of the sensing unit. This rheostat merely adjusts the strength of the magnet's field of flux to vary its retarding effect upon the flexing of the bimetal legs. When the temperature of the receptacle is at a predetermined level, the legs carry the bridge contact over against the adjacent contacts to complete the circuit to the relay coil in turn operating to stop energy flow to the heating unit.

While the specific embodiment of the invention has been incorporated in an electrical range type heating unit for domestic use, it is contemplated that the sensing unit and its controls may have a much wider application in heater structures. In the illustrated embodiment of the present invention there is no need for a mechanical connection between the sensing unit and the manual controls, permitting the manual controls to be placed at a remote location relative to the receptacle sensing unit.

I claim:

1. A control for an electrical heating unit for a stove, comprising: a generally U-shaped bimetallic member floatingly mounted on the unit and resiliently urged to a first position wherein the base of the member is above the unit to be contacted and moved downwardly by a receptacle placed upon the heating unit, said member having a pair of legs extending generally downwardly from the base; an electrical-circuit-completing device carried by each leg; a first electrical circuit controlling the delivery of heating energy to said unit at a first level; a second electrical circuit controlling the delivery of heating energy to said unit at a second level, with one of said devices being arranged to complete the first circuit after a predetermined degree of movement of its associated leg and with the other of said devices being arranged to complete the second circuit after a greater degree of movement of its associated leg and a manually operable switch for selectively connecting either of said circuits to control the energy delivery to the heating unit.

2. A control for a stove heating unit having means for controlling energy flow to the heating unit, comprising: a sensing unit thermally responsive to temperature of a receptacle being heated by the stove heating unit; a plurality of contacts in series with a power source and controlled by said sensing unit; an electrical operator for said controlling means; switch means for connecting said operator selectively with certain of said contacts for control of the heating unit; and manually variable retarding means operative on the sensing unit to delay operation of the contacts, the retarding means affecting the sensing unit differently for different contacts, controlling the heating unit heat output responsive to preselected temperature of the receptacle in relatively high and low heat ranges in accordance with the selection of said switch means.

3. A control for a stove heating unit having an electric heating coil and relay contacts controlling flow of energy to the unit, comprising: a thermal sensing unit mounted in the heating unit and having a thermally responsive element yieldingly urged outwardly of the heating unit for contact with a receptacle placed on the heating unit, said element having a pair of depending legs each carrying an insulated bridge contact; a pair of spaced contacts opposite each leg in series relation with a power source; a relay selectively connectable in series with either pair of contacts and having relay contacts connected to stop flow of energy to the heating unit when the relay is energized, said element legs being heat responsive to move the bridge contact against the adjacent pair of contacts to complete the circuit to the relay coil; an electro-magnet having a core member adjacent each leg positioned to provide a field of flux retarding movement of the leg toward the adjacent pair of contacts, said core members being positioned to provide dissimilar retarding force on the legs; and a manually variable rheostat for varying the intensity of the field of flux for control of the receptacle heat selectively with either leg of the thermally responsive element.

4. A control for an electrical heating unit for a stove, comprising: thermal sensing means responsive to the temperature of a receptacle held by the stove heating unit and having two portions movable in accordance with said temperature, each portion including a magnetic part; a movable contact carried by each of said portions; a fixed contact associated with said movable contacts; circuit means connecting said movable and fixed contacts with said unit for effecting controlled energization thereof and including means for selectively connecting one or the other of said movable contacts in such circuit; and adjustable magnetic field producing means associated with the movable portions of said sensing means and affecting each of said portions differently, modifying the response of said portions to the temperature of the receptacle, the selected movable contact which is connected in the circuit determining the temperature range of the control.

References Cited in the file of this patent
UNITED STATES PATENTS

| | | |
|---|---|---|
| 2,181,606 | Parks | Nov. 28, 1939 |
| 2,425,459 | Cornelius | Aug. 12, 1947 |
| 2,575,084 | Akeley | Nov. 13, 1951 |
| 2,638,496 | Church | May 12, 1953 |
| 2,667,566 | Huck et al. | Jan. 26, 1954 |
| 2,943,176 | Holtkamp | June 28, 1960 |